US008175271B2

(12) United States Patent
Belgaied et al.

(10) Patent No.: US 8,175,271 B2
(45) Date of Patent: May 8, 2012

(54) METHOD AND SYSTEM FOR SECURITY PROTOCOL PARTITIONING AND VIRTUALIZATION

(75) Inventors: Kais Belgaied, Sunnyvale, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1432 days.

(21) Appl. No.: 11/731,601

(22) Filed: Mar. 30, 2007

(65) Prior Publication Data

US 2008/0240432 A1 Oct. 2, 2008

(51) Int. Cl.
*H04K 1/00* (2006.01)
(52) U.S. Cl. ............................. 380/255; 726/13; 713/165
(58) Field of Classification Search .................. 380/270, 380/255, 247; 713/150, 100, 182, 188, 189; 726/26, 27, 28, 29, 30; 709/201, 212, 213, 709/220, 223, 200
See application file for complete search history.

(56) References Cited

U.S. PATENT DOCUMENTS

| 6,041,053 | A | 3/2000 | Douceur et al. |
|---|---|---|---|
| 6,070,219 | A | 5/2000 | McAlpine et al. |
| 6,163,539 | A | 12/2000 | Alexander et al. |
| 6,477,643 | B1 | 11/2002 | Vorbach et al. |
| 6,600,721 | B2 | 7/2003 | Edholm |
| 6,714,960 | B1 | 3/2004 | Bitar et al. |
| 6,757,731 | B1 | 6/2004 | Barnes et al. |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 7,046,665 | B1 | 5/2006 | Walrand et al. |
| 7,177,311 | B1 | 2/2007 | Hussain et al. |
| 7,260,102 | B2 | 8/2007 | Mehrvar et al. |
| 7,313,142 | B2 | 12/2007 | Matsuo et al. |
| 2003/0037154 | A1 | 2/2003 | Poggio et al. |
| 2003/0169877 | A1* | 9/2003 | Liu et al. .......................... 380/28 |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2006/0041667 | A1 | 2/2006 | Ahn et al. |
| 2006/0045089 | A1 | 3/2006 | Bacher et al. |
| 2006/0070066 | A1 | 3/2006 | Grobman |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Vivek Srivastava
*Assistant Examiner* — Nega Woldemariam
(74) *Attorney, Agent, or Firm* — Osha • Liang LLP (57) ABSTRACT

A method for implementing a security protocol, involving receiving a packet from a network connection, obtaining an identifier for one of a plurality of security association database (SADB) partitions associated with the packet, wherein each of the plurality of SADB partitions is associated with one of a plurality of packet destinations, applying a security association from the one of the plurality of SADB partitions to the packet, and sending the packet to the one of the plurality of packet destinations associated with the SADB partition, wherein the packet is processed at the one of the plurality of packet destinations.

20 Claims, 5 Drawing Sheets

U.S. PATENT DOCUMENTS

2006/0074899 A1* 4/2006 Enderwick et al. ............... 707/4
2006/0174324 A1 8/2006 Zur et al.
2007/0162744 A1* 7/2007 Hoshino et al. ............... 713/156
2008/0022094 A1* 1/2008 Gupta et al. .................. 713/165
2009/0328192 A1* 12/2009 Yang et al. ...................... 726/15

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

* cited by examiner

METHOD AND SYSTEM FOR SECURITY PROTOCOL PARTITIONING AND VIRTUALIZATION

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Pat. No. 7,672,299; "Method and System for Controlling Virtual Machine Bandwidth" with U.S. Pat. No. 7,613,132; "Virtual Switch" with U.S. Pat. No. 7,643,482; "System and Method for Virtual Network Interface Cards Based on Internet Protocol Addresses" with U.S. Pat. No. 7,684,423; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. Pat. No. 7,792,140; "Method and Apparatus for Containing a Denial of Service Attack Using Hardware Resources on a Virtual Network Interface Card" with U.S. Pat. Ser. No. 7,966,401; "Virtual Network Interface Cards with VLAN Functionality" with U.S. Pat. No. 7,742,474; "Method and Apparatus for Dynamic Assignment of Network Interface Card Resources" with U.S. Pat. No. 7,613,198; "Generalized Serialization Queue Framework for Protocol Processing" with U.S. Pat. No. 7,715,416; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. Pat. No. 7,836,212; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. Pat. No. 8,005,022; "Multi-Level Packet Classification" with U.S. Pat. No. 7,848,331; "Method and System for Automatically Reflecting Hardware Resource Allocation Modifications" with U.S. Pat. No. 7,788,411; "Multiple Virtual Network Stack Instances Using Virtual Network Interface Cards" with U.S. Pat. No. 7,885,257; "Method and System for Network Configuration for Containers" with U.S. Pat. No. 7,912,926; "Network Memory Pools for Packet Destinations and Virtual Machines" with U.S. application Ser. No. 11/490,486; "Method and System for Network Configuration for Virtual Machines" with U.S. application Ser. No. 11/489,923; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. Pat. No. 7,733,795 and "Method and System for Creating A Demilitarized Zone using Network Stack Instances" with U.S. Pat. No. 7,633,864 filed on Dec. 20, 2006.

The present application contains subject matter that may be related to the subject matter in the following U.S. application filed on Dec. 20, 2006, and assigned to the assignee of the present application: "Network Stack Instance Architecture with Selection of Transport Layers" with U.S. application Ser. No. 11/642,490; "Method and System for Virtual Routing Using Containers" with U.S. application Ser. No. 11/642,756.

The present application contains subject matter that may be related to the subject matter in the following U.S. applications filed on Mar. 31, 2007, and assigned to the assignee of the present application: "Method and System for Inheritance of Network Interface Card Capabilities" with U.S. application Ser. No. 11/731,458; "Method and System for Virtualization of Packet Encryption Offload and Onload" with U.S. application Ser. No. 11/789,337; "Combined Security Protocol and Packet Filter Offload and Onload" with U.S. Pat. No. 8,006,297.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet. The payload includes the actual data to be transmitted from the network to the receiving system.

Each of the packets sent between the sending system and receiving system is typically associated with a connection. The connection ensures that packets from a given process on the sending system reach the appropriate process on the receiving system. The connection may also be secured by encrypting and authenticating the packets before transmission. Packets received by the receiving system (via a NIC associated with the receiving system) are analyzed by a classifier to determine the connection associated with the packet. If the packets are encrypted, the packets may be decrypted by the CPU, or by a cryptographic offload engine located elsewhere on the receiving system.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for implementing a security protocol, comprising receiving a packet from a network connection, obtaining an identifier for one of a plurality of security association database (SADB) partitions associated with the packet, wherein each of the plurality of SADB partitions is associated with one of a plurality of packet destinations, applying a security association from the one of the plurality of SADB partitions to the packet, and sending the packet to the one of the plurality of packet destinations associated with the SADB partition, wherein the packet is processed at the one of the plurality of packet destinations.

In general, in one aspect, the invention relates to a network interface card, comprising a cryptographic offload engine and a plurality of security association database (SADB) partitions associated with the cryptographic offload engine, wherein each of the plurality of SADB partitions is associated with one of a plurality of packet destinations, and wherein the cryptographic offload engine is configured to receive a packet from a network connection, wherein the packet is encrypted using a security protocol, obtain an identifier for one of the plurality of security association database (SADB) partitions associated with the packet, apply a security association from the one of the plurality of SADB partitions to the packet to obtain a decrypted packet, and send the decrypted packet to the one of the plurality of packet destinations associated with the SADB partition.

In general, in one aspect, the invention relates to a computer readable medium comprising software instructions to perform a method, the method comprising receiving a packet from a network connection, obtaining an identifier for one of a plurality of security association database (SADB) partitions associated with the packet, wherein each of the plurality of SADB partitions is associated with one of a plurality of packet destinations, applying a security association from the one of the plurality of SADB partitions to the packet, and sending the packet to the one of the plurality of packet destinations associated with the SADB partition, wherein the packet is processed at the one of the plurality of packet destinations.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to partition and virtualize a security protocol (e.g., Internet Protocol Security (IPsec)). The security protocol may be implemented on a computer that sends and receives network traffic to and from other computers. In addition, the security protocol may include functionality such as encryption and authentication of packets. Further, in one embodiment of the invention, the security protocol may implement a secure connection between two networked devices (e.g., computers operatively connected to a common network) using a security association (SA). In addition, the security protocol includes information detailing how to process packets from a given connection according to a security policy.

Specifically, embodiments of the invention provide a method and system to partition and virtualize a security protocol by creating multiple security association database (SADB) partitions for a single cryptographic offload engine, as well as multiple security policy database (SPD) partitions for a single policy engine. In one embodiment of the invention, the cryptographic offload engine and policy engine may be located in a network interface card (NIC) attached to a host. Further, in one embodiment of the invention, each SADB partition may also be associated with an internet key exchange (IKE) daemon, where the IKE daemons reside on the host, which generated SAs stored in the SADB partition. In addition, each SPD partition may be associated with a destination policy database located on the host.

In one embodiment of the invention, an application or container associated with a SADB partition and/or a SPD partition may only be allowed to access the SAs in the SADB partition and/or the security policies in the SPD partition. In one embodiment of the invention, such a configuration enables multiple security policies to be implemented independently on a single computer.

Figure 1:
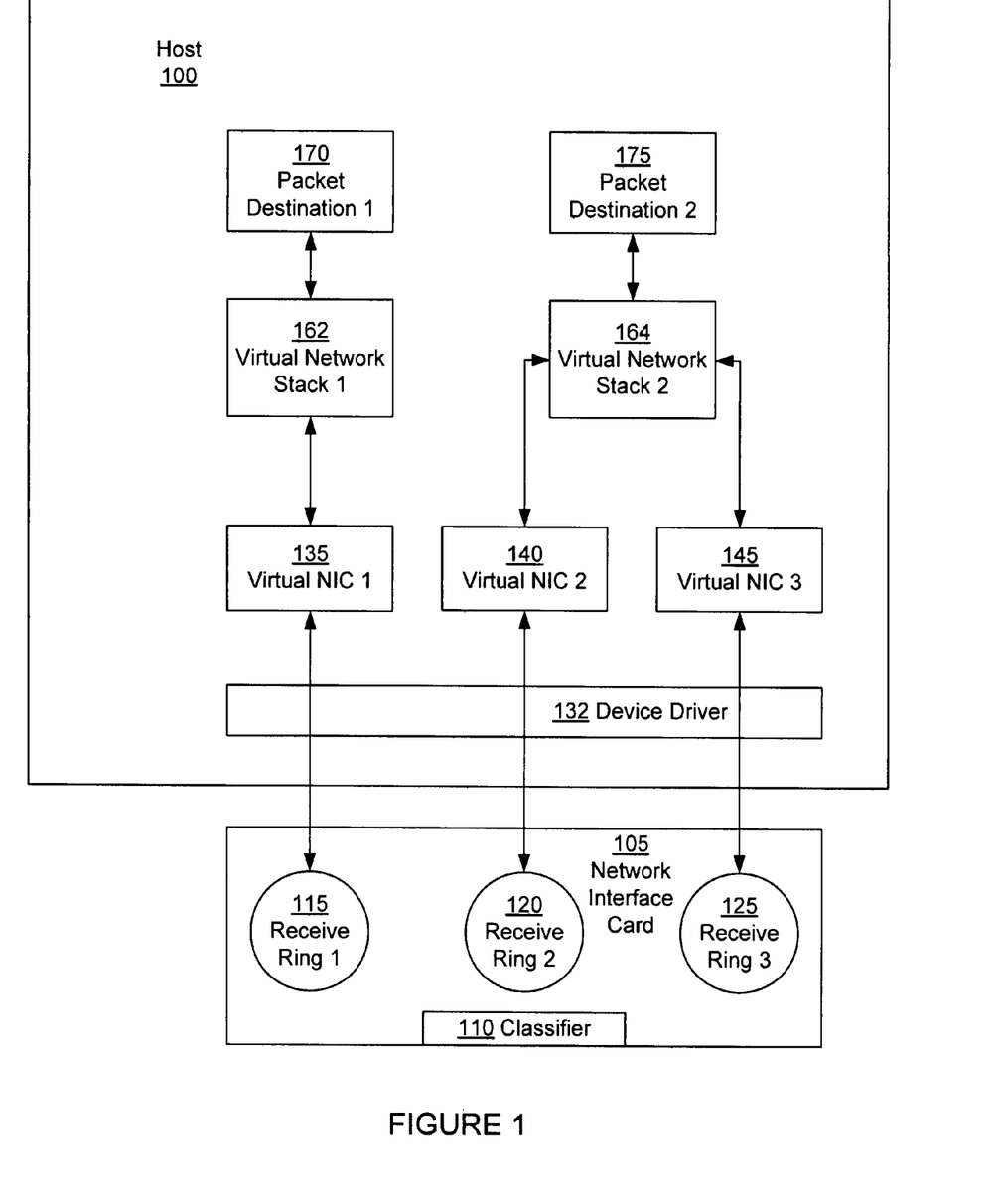
FIGS. 1-2 show schematic diagrams in accordance with one or more embodiments of the invention.

FIG. 1 shows a schematic diagram of a system in accordance with one or more embodiments of the invention. As shown in FIG. 1, the system includes a host (100), a network interface card (NIC) (105), multiple virtual network stacks (e.g., virtual network stack 1 (162), virtual network stack 2 (164)), multiple virtual NICs (e.g., virtual NIC 1 (135), virtual NIC 2 (140), virtual NIC 3 (145)), and multiple packet destinations (e.g., packet destination 1 (170), packet destination 2 (175)). Each of these components is described below.

In one embodiment of the invention, the NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network) configured to receive packets from the network and send packets to the network. For example, the NI may correspond to an RJ-45 connector, a wireless antenna, etc. The packets received by the NI are forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets are forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. The classifier (110) may also use other data found in the packet, such as the destination Media Access Control (MAC) address, to classify the packet. The classifier (110) may be implemented by a separate microprocessor (not shown) embedded on the NIC (105). Alternatively, the classifier (110) may be implemented in software stored in memory (e.g., firmware, etc.) on the NIC (105) and executed by a microprocessor (not shown) on the NIC (105).

In one or more embodiments of the invention, the host (100) may include a device driver (132) and one or more virtual NICs (e.g., virtual NIC 1 (135), virtual NIC 2 (140), virtual NIC 3 (145)). In one embodiment of the invention, the device driver (132) provides an interface between the receive rings (e.g., receive ring 1 (115), receive ring 2 (120), receive ring 3 (125)) and the host (100). More specifically, the device driver (132) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (135), virtual NIC 2 (140), virtual NIC 3 (145)) receives incoming packets from a corresponding receive ring(s) (e.g., receive ring 1 (115), receive ring 2 (120), receive ring 3 (125)). Similarly, in one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1 (135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1 (135), virtual NIC 2 (140), virtual NIC 3 (145)) are operatively connected to packet destinations (e.g., packet destination 1 (170), packet destination 2 (175)), which include containers and/or applications, via virtual network stacks (e.g., virtual network stack (162), virtual network stack 2 (164)). The virtual NICs (e.g., virtual NIC 1 (135), virtual NIC 2 (140), virtual NIC 3 (145)) provide an abstraction layer between the NIC (105) and the packet destinations (e.g., packet destination 1 (170), packet destination 2 (175)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more Internet Protocol (IP) addresses, associated with one or more MAC addresses, optionally associated with one or more ports, and optionally configured to handle one or more protocol types. Thus, while the host (100) may be operatively connected to a single NIC (105), packet destinations (e.g., packet destination 1 (170), packet destination 2 (175)), such as containers or applications, executing on the host (100) operate as if the host (100) is bound to multiple NICs.

In one embodiment of the invention, each virtual network stack (e.g., virtual network stack (162), virtual network stack 2 (164)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack (162), virtual network stack 2 (164)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack (162), virtual network stack 2 (164)) implement an IP layer (not shown) and a TCP layer (not shown).

Figure 2:
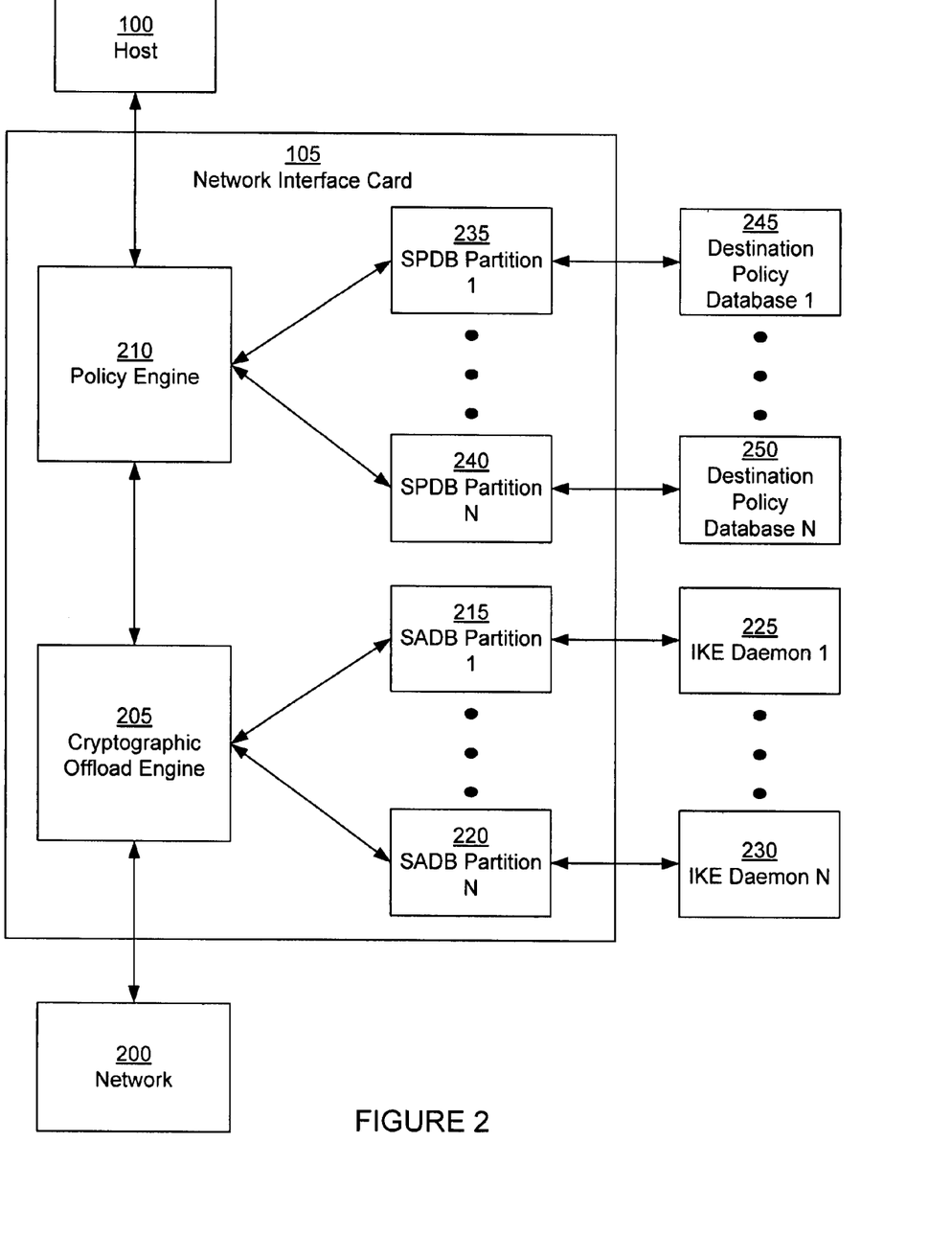

FIG. 2 shows a schematic diagram of a system in accordance with one or more embodiments of the invention. In one or more embodiments of the invention, the system of FIG. 2 is used to implement security protocol virtualization and partitioning. In addition, the security protocol virtualization and partitioning may be applied to the system of FIG. 1, as explained below. The system of FIG. 2 includes a NIC (105) (corresponding to NIC (105) in FIG. 1) and a network (200). The NIC (105) further includes a cryptographic offload engine (205), a policy engine (210), multiple security association database (SADB) partitions (e.g., SADB partition 1 (215), SADB partition n (220)), and multiple security policy database (SPD) partitions (e.g., SPD partition 1 (235), SPD partition n (240)). Additionally, the NIC (105) may be operatively connected to a host, such as the host of FIG. 1. Each of these components is described in further detail below.

As mentioned previously, the NIC (105) is responsible for sending and receiving packets to and from other network devices on a network (200). To secure the transmission of packets over the network (200), packets in the NIC (105) may be encrypted before being transmitted over the network (200) or decrypted after receipt from another host (or other device operatively connected to the network) on the network (200). In one or more embodiments of the invention, a security protocol is implemented to encrypt, decrypt, and/or authenticate packets sent and received by the NIC (105) over the network (200). In one or more embodiments of the invention, the security protocol used to encrypt, decrypt, and/or authenticate packets sent and received by the NIC (105) over the network (200) is Internet Protocol Security (IPsec). The IPsec security model is described in Request for Comments (RFC) 4301-4309, all of which are incorporated by reference. Those skilled in the art will appreciate that other security protocols, such as Secure Sockets Layer (SSL) and Transport Layer Security (TLS), may also be partitioned and virtualized using one or more embodiments of the invention.

In one or more embodiments of the invention, encryption and decryption of packets, as well as implementation of security policies, may be executed using a central processing unit (CPU) on a host associated with the NIC (105). For example, IPsec Authenticating Header (AH), Encapsulating Security Payload (ESP), and packet encryption and decryption may be carried out using a CPU on the host of FIG. 1. Alternatively, IPsec AH, ESP, encryption and decryption may be partially or wholly implemented using a cryptographic offload engine (205) and/or a policy engine (210) located on the NIC (105). In one or more embodiments of the invention, a processor (not shown) and memory (not shown) on the NIC (105) are used to implement the cryptographic offload engine (205), policy engine (210), SADB partitions (e.g., SADB partition 1 (215), SADB partition n (220)), and SPD partitions (e.g., SPD partition 1 (235), SPD partition n (240)).

As shown in FIG. 2, the cryptographic offload engine (205) is associated with multiple SADB partitions (e.g., SADB partition 1 (215), SADB partition n (220)). Similarly, the policy engine (210) is associated with multiple SPD partitions (e.g., SPD partition 1 (235), SPD partition n (240)). The SADB partitions (e.g., SADB partition 1 (215), SADB partition n (220)) and/or SPD partitions (e.g., SPD partition 1 (235), SPD partition n (240)) may be located on shared memory on the NIC (105). Further, the SADB partitions (e.g., SADB partition 1 (215), SADB partition n (220)) and/or SPD partitions (e.g., SPD partition 1 (235), SPD partition n (240)) may refer to database partitions within a single database and/or disk partitions within the memory on the NIC (105). Those skilled in the art will appreciate that the SADB partitions (e.g., SADB partition 1 (215), SADB partition n (220)) and/or SPD partitions (e.g., SPD partition 1 (235), SPD partition n (240)) may be distributed across multiple storage devices. For example, the SADB partitions (e.g., SADB partition 1 (215), SADB partition n (220)) and/or SPD partitions (e.g., SPD partition 1 (235), SPD partition n (240)) may be located in multiple memory devices on the NIC (105), multiple disk drives on the host, or a combination of storage devices on the NIC (105) and host.

In one or more embodiments of the invention, each SADB partition (e.g., SADB partition 1 (215), SADB partition n (220)) and SPD partition (e.g., SPD partition 1 (235), SPD partition n (240)) is associated with an identifier, a capacity, and an address. The identifier may correspond to a unique name for the SADB partition (e.g., SADB partition 1 (215), SADB partition n (220)) or SPD partition (e.g., SPD partition 1 (235), SPD partition n (240)). The capacity may refer to the partition's storage capacity. The address may refer to the memory address of the partition. In one or more embodiments of the invention, the identifier, capacity, and address are stored on the host and managed by a processor executing on the host. Further, the aforementioned process executing on the host may also include functionality to create, allocate, and destroy SADB partitions (e.g., SADB partition 1 (215), SADB partition n (220)) and SPD partitions (e.g., SPD partition 1 (235), SPD partition n (240)) on the NIC (105).

In one or more embodiments of the invention, the SADB partitions (e.g., SADB partition 1 (215), SADB partition n (220)) store security associations (SAs) used to secure network traffic between the NIC (105) and other network devices over the network (200). In one or more embodiments of the invention, an SA corresponds to a logical connection that allows security information to be shared between two network entities to support secure communication. For example, an SA may be used to secure a network connection between the NIC (105) and another NIC on the network (200) using packet encryption and/or authentication. In addition, the SA may include one or more cryptographic keys, initialization vectors, and/or digital certificates. In other words, an SA corresponds to a group of security parameters for sharing information with another entity on the network (200). In one or more embodiments of the invention, the cryptographic offload engine (205) exchanges SAs in the SADB partitions (e.g., SADB partition 1 (215), SADB partition n (220)) with other hosts on the network (200). In addition, the cryptographic offload engine (205) may authenticate, encrypt, and/or decrypt incoming and outgoing packets using SAs in the SADB partitions (e.g., SADB partition 1 (215), SADB partition n (220)). In one or more embodiments of the invention, SAs in the SADB partitions (e.g., SADB partition 1 (215), SADB partition n (220)) correspond to IPsec SAs.

In one or more embodiments of the invention, the SPD partitions (e.g., SPD partition 1 (235), SPD partition n (240)) store security policies (SPs), which dictate access to packet destinations on a host operatively connected to the NIC (105), such as the host of FIG. 1. In one or more embodiments of the invention, an SP corresponds to a rule or set of rules that determine how packets in the NIC (105) are processed. For example, an SP may determine whether outgoing packets are to be authenticated or encrypted using the security protocol. In addition, an SP may determine whether incoming packets are allowed or denied access past the policy engine (210). An SP may further specify how packets which are denied access are processed. For example, the SP may dictate that packets denied access are dropped, or, alternatively, that the packets are stored for future reference. In one or more embodiments of the invention, the policy engine (210 is responsible for implementing the SPs stored in the SPD partitions (e.g., SPD partition 1 (235), SPD partition n (240)). In one or more embodiments of the invention, SPs in the SPD partitions (e.g., SPD partition 1 (235), SPD partition n (240)) correspond to IPsec SPs.

In one or more embodiments of the invention, each packet destination in the host is associated with an SADB partition (e.g., SADB partition 1 (215), SADB partition n (220)) and an SPD partition (e.g., SPD partition 1 (235), SPD partition n (240)) on the NIC (105). In other words, security rules regarding connections to a packet destination are specified in the SP(s) of the corresponding SPD partition (e.g., SPD partition 1 (235), SPD partition n (240)). Similarly, cryptographic keys, initialization vectors, digital certificates, etc. for authenticating, encrypting, and/or decrypting packets associated with the packet destination are stored in the SA(s) of the corresponding SADB partition (e.g., SADB partition 1 (215), SADB partition n (220)). Further, utilities associated with the packet destination, such as internet key exchange (IKE) daemons (e.g., IKE daemon 1 (225), IKE daemon n (230)) and destination policy databases (e.g., destination policy database 1 (245), destination policy database n (250)) are only allowed access to the partitions assigned to the packet destination, thus preventing unauthorized access to other partitions by the packet destination and associated utilities.

In one or more embodiments of the invention, each SADB partition (e.g., SADB partition 1 (215), SADB partition n (220)) is associated with an IKE daemon (e.g., IKE daemon 1 (225), IKE daemon n (230)) on the host. In one or more embodiments of the invention, SAs in an SADB partition (e.g., SADB partition 1 (215), SADB partition n (220)) are created and maintained by the corresponding IKE daemon (e.g., IKE daemon 1 (225), IKE daemon n (230)) in accordance with RFC 4301-4309, all of which are incorporated by reference.

In one or more embodiments of the invention, each SPD partition (e.g., SPD partition 1 (235), SPD partition n (240)) is associated with a destination policy database (e.g., destination policy database 1 (245), destination policy database n (250)) on the host. In one or more embodiments of the invention, SPs for a packet destination on the host are created and stored in the destination policy database (e.g., destination policy database 1 (245), destination policy database n (250)) corresponding to the packet destination. The SPs in the destination policy database (e.g., destination policy database 1 (245), destination policy database n (250)) may then be transferred to the SPD partition (e.g., SPD partition 1 (235), SPD partition n (240)) associated with the packet destination to allow the policy engine (210) to access the SPs.

As an example, a host may include two packet destinations: a financial enterprise application and a weblog. Each packet destination is associated with an SADB partition and an SPD partition. SPs for the financial enterprise application may specify authentication or encryption of incoming and outgoing packets, due to the sensitive nature of financial information. In addition, certain parts of the financial enterprise application may be accessible only by machines on the same local area network (LAN) as the host. As a result, the financial enterprise application may have a large number of SAs for authenticating, encrypting, and/or decrypting incoming and outgoing packets and SPs which deny access to the application for certain incoming packets. Further, incoming packets that have been decrypted by the cryptographic offload engine may be denied access to the application by the policy engine, if the packets contain values that are blocked by SPs in the SPD partition corresponding to the application.

On the other hand, the weblog may include public information accessible from any location on the network. As a result, the SPs in the SPD partition assigned to the weblog may allow most, if not all, packets past the policy engine as clear text. Further, the SPs may specify a bypass of the security protocol by packets bound for and/or originating from the weblog. In addition, SAs in the SADB partition corresponding to the weblog may specify encryption or authentication of packets only for the author and/or administrator of the weblog, who may choose to login and update the contents of the weblog.

Figure 3:
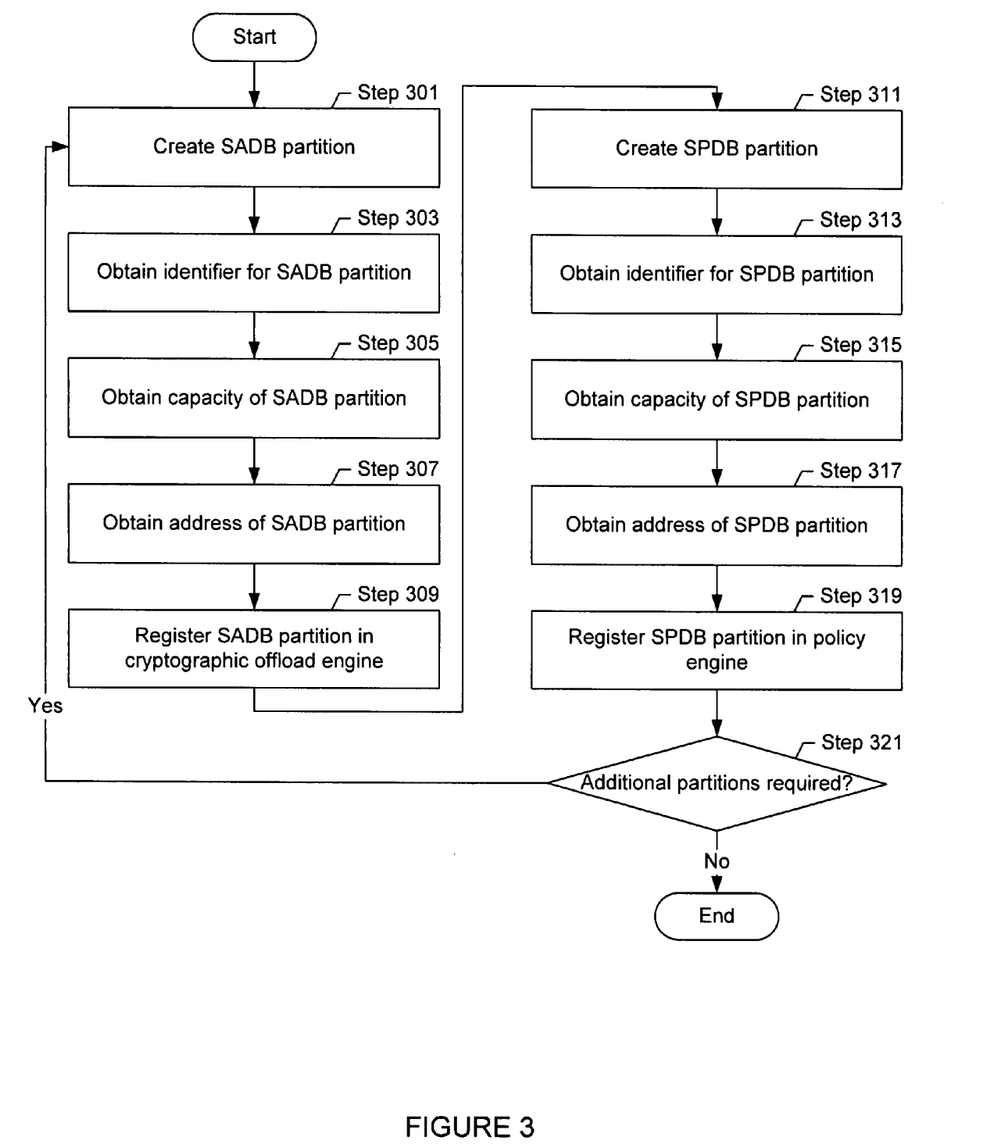
FIGS. 3-4 show flow diagrams in accordance with one or more embodiments of the invention.

FIG. 3 shows a flow diagram for partition creation in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, an SADB partition is created (Step 301). As mentioned above, the SADB partition may be associated with a packet destination on a host. The SADB partition may store SAs for connections with the packet destination. In addition, the SADB partition may include a reference to a database partition and/or a disk partition. The SAs may also be accessible by a cryptographic offload engine located on a NIC attached to the host.

An identifier for the SADB partition is obtained (Step 303). The identifier may be a string of alphabetic and/or numeric characters that uniquely identify the SADB partition. The identifier may be specified by user (e.g., an administrator) or may be generated using an algorithm.

A capacity of the SADB partition is also obtained (Step 305). The capacity may be allocated based on the number of SAs required by the packet destination. For example, a packet destination requiring a large amount of SAs, such as an enterprise application, may be allocated a larger capacity than a packet destination requiring a small amount of SAs, such as a weblog. The capacity may refer to disk capacity, or the capacity may refer to a maximum number of SA entries the SADB may store at a given time.

In addition to an identifier and a capacity, an address for the SADB partition is obtained (Step 307). As stated above, the address may refer to a memory address of the partition. Once the aforementioned information is obtained, the SADB partition is registered in a cryptographic offload engine (Step 309), which may be located on a NIC operatively connected to the host. The SADB partition may be registered using a process executing on the host. Further, the SADB partition may be associated with an IKE daemon on the host, which may begin populating the SADB partition with SAs for the packet destination.

An SPD partition is also created (Step 311). In one or more embodiments of the invention, the SPD partition is also associated with the packet destination on the host. In one or more embodiments of the invention, the SPD partition stores SPs associated with the packet destination. As with the SADB partition, an identifier (Step 313), capacity (Step 315), and address (Step 317) are obtained for the SPD partition. The SPD partition is then registered in the policy engine (Step 319), which may also be located on the NIC. In one embodiment of the invention, the SPD partition may also be registered using a process executing on the host. In addition, the SPD partition may be associated with a destination policy database on the host, which may begin transferring SPs to the SPD partition from the host.

A determination is made regarding whether additional partitions are required (Step 321). For example, additional SADB and SPD partitions may be needed for other packet destinations on the host. Additional SADB and SPD partitions may also be needed for the packet destination to further virtualize and partition security protocol implementations for the packet destination. If additional partitions are needed, additional SADB partitions and SPD partitions are created and registered in accordance with Steps 301-319.

Figure 4:
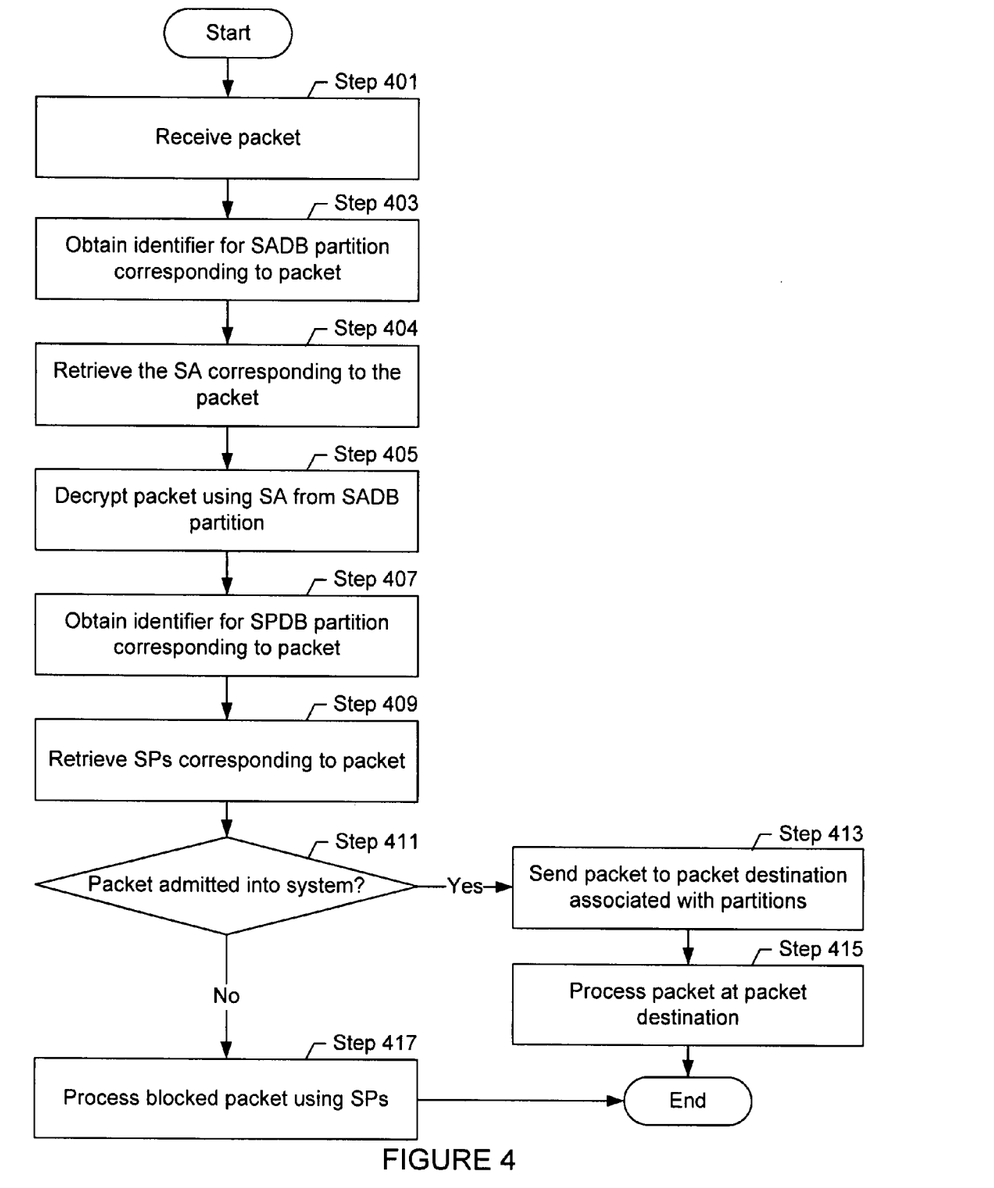

FIG. 4 shows a flow diagram of packet processing in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, a packet is received (Step 401). The packet may be an incoming packet from any host on the network. Once the packet is received, an identifier for the SADB partition corresponding to the packet is obtained (Step 403). The identifier may be obtained by analyzing the contents of the packet header. Alternatively, the packet may be placed into a receive ring corresponding to an SADB partition, thus associating the packet with the SADB partition. An SA corresponding to the packet is retrieved (Step 404) from the SADB partition.

The packet is decrypted using the SA (Step 405). Alternatively, any authentication present in the packet may be verified using the SA. If the packet is not encrypted or authenticated, no decryption or authentication verification is necessary. An identifier for the SPD partition corresponding to the packet is also obtained (Step 407). As with the SADB partition, the identifier for the SPD partition may be obtained by analyzing the packet header, or the SPD partition identifier may be obtained by determining the SPD partition associated with the receive ring in which the packet is located.

The SPs corresponding to the packet are retrieved (Step 409) from the SPD partition using the identifier for the SPD. As mentioned previously, the SPs determine how incoming and outgoing packets are processed. Specifically, the SPs may determine if an outgoing packet requires security protocol processing (e.g., computation of the integrity check value for authentication, encryption, etc.), if an outgoing packet may bypass security protocol processing, and/or if an incoming packet is allowed into the system (Step 411). For example, an SP may block a packet's entry into the system after the packet is decrypted, even if the packet includes a security parameter index (SPI) and destination address for the packet destination.

If the packet is allowed into the system, the packet is sent to the packet destination associated with the SADB and SPD partitions (Step 413), where the packet is processed (Step 415). If the packet is blocked from entering the system, the blocked packet is processed according to SPs in the SPD partition (Step 417). For example, the packet may be dropped, or the packet may be stored in part or in whole for further analysis and/or future reference.

Figure 5:
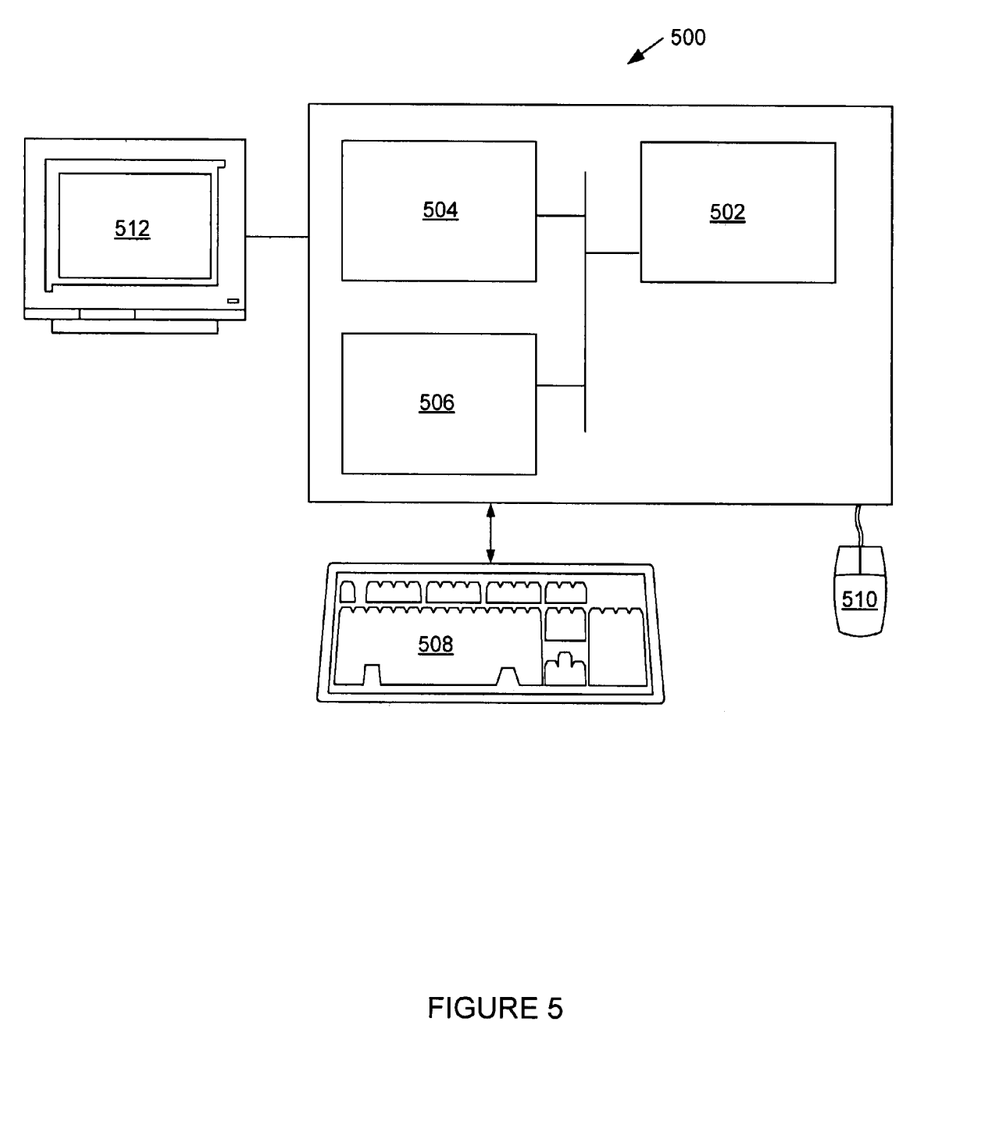
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NIC, cryptographic offload engine, SADB partitions, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for implementing a security protocol, comprising:
   receiving, by a network interface card (NIC), a packet from a network connection, wherein the NIC comprises NIC memory storing a plurality of security association database (SADB) partitions;
   obtaining, by a cryptographic offload engine (COE) on the NIC, an identifier for a SADB partition associated with the packet, wherein the SADB partition is one of the plurality of SADB partitions stored in NIC memory;
   retrieving, by the COE using the identifier, a security association from the SADB partition stored in NIC memory, wherein the SADB partition is associated with a packet destination of a plurality of packet destinations on a host directly connected to the NIC;
   applying, by the COE, the security association from the SADB partition to the packet; and
   sending, by the NIC, the packet to the packet destination associated with the SADB partition,
   wherein the packet is processed at the packet destination on the host.

2. The method of claim 1, further comprising:
   obtaining an identifier for one of a plurality of security policy database (SPD) partitions associated with the packet, wherein each of the plurality of SPD partitions is associated with one of the plurality of packet destinations; and
   applying a security policy from the one of the plurality of SPD partitions to the packet,
   wherein the security policy determines an admittance of the packet to the packet destination.

3. The method of claim 2, wherein each of the plurality of SPD partitions is associated with one of a plurality of destination policy databases.

4. The method of claim 3, further comprising:
   populating the plurality of SPD partitions using the plurality of policy databases.

5. The method of claim 1, wherein each of the plurality of SADB partitions is associated with an identifier, a capacity, and an address.

6. The method of claim 1, wherein each of the plurality of SPD partitions is associated with an identifier, a capacity, and an address.

7. The method of claim 1, wherein each of the plurality of SADB partitions is associated with one of a plurality of internet key exchange (IKE) daemons.

8. The method of claim 1, wherein each of the plurality of SADB partitions is associated with the COE.

9. The method of claim 1, wherein the plurality of SADB partitions are located on a plurality of disk partitions within the NIC memory.

10. The method of claim 1, wherein the security association comprises a plurality of security parameters used to secure the network connection.

11. A system comprising:
a host comprising a plurality of packet destinations; and
a network interface card (NIC) directly connected to the host, comprising:
a cryptographic offload engine; and
NIC memory storing a plurality of security association database (SADB) partitions associated with the cryptographic offload engine,
wherein each of the plurality of SADB partitions is associated with one of the plurality of packet destinations on the host directly connected to the NIC, and
wherein the cryptographic offload engine is configured to:
receive a packet from a network connection, wherein the packet is encrypted using a security protocol;
obtain an identifier for a SADB partition associated with the packet, wherein the SADB partition is one of the plurality of SADB partitions stored in NIC memory, and wherein the SADB partition is associated with a packet destination of the plurality of packet destinations;
retrieve a security association from the SADB partition stored in NIC memory;
apply the security association from the SADB partition to the packet to obtain a decrypted packet; and
send the decrypted packet to the packet destination associated with the SADB partition.

12. The system of claim 11, wherein the NIC further comprises:
a policy engine; and
a plurality of security policy database (SPD) partitions associated with the policy engine,
wherein each of the plurality of SPD partitions comprises a plurality of security policies, and
wherein at least one of the plurality of security policies determines an admittance of the packet to the packet destination.

13. The system of claim 12, wherein each of the plurality of SPD partitions is associated with one of a plurality of destination policy databases, and wherein each of the plurality of destination policy databases is located on the host directly connected to the NIC.

14. The system of claim 11, wherein each of the plurality of SADB partitions is associated with one of a plurality of internet key exchange (IKE) daemons.

15. The system of claim 11, wherein each of the plurality of SADB partitions is associated with an identifier, a capacity, and an address.

16. The system of claim 15, wherein the address corresponds to a location in NIC memory.

17. The system of claim 11, wherein the security association comprises a plurality of security parameters used to secure the network connection.

18. A non-transitory computer readable medium comprising software instructions to perform a method, the method comprising:
receiving, by a network interface card (NIC), a packet from a network connection, wherein the NIC comprises NIC memory storing a plurality of security association database (SADB) partitions;
obtaining, by a cryptographic offload engine (COE) on the NIC, an identifier for a SADB partition associated with the packet, wherein the SADB partition is one of the plurality of SADB partitions stored in NIC memory;
retrieving, by the COE using the identifier, a security association from the SADB partition stored in NIC memory, wherein the SADB partition is associated with a packet destination of a plurality of packet destinations on a host directly connected to the NIC;
applying, by the COE, the security association from the SADB partition to the packet; and
sending, by the NIC, the packet to the packet destination associated with the SADB partition,
wherein the packet is processed at the packet destination on the host.

19. The non-transitory computer readable medium of claim 18, the method further comprising:
obtaining an identifier for one of a plurality of security policy database (SPD) partitions associated with the packet, wherein each of the plurality of SPD partitions is associated with one of the plurality of packet destinations; and
applying a security policy from the one of the plurality of SPD partitions to the packet,
wherein the security policy determines an admittance of the packet to the packet destination.

20. The non-transitory computer readable medium of claim 18, wherein each of the plurality of SPD partitions is associated with one of the plurality of destination policy databases.

* * * * *